April 21, 1953  T. DE FOREST ET AL  2,636,127
METHOD OF DETECTING CRACKS IN POROUS SURFACES
Filed March 14, 1949  2 SHEETS—SHEET 1
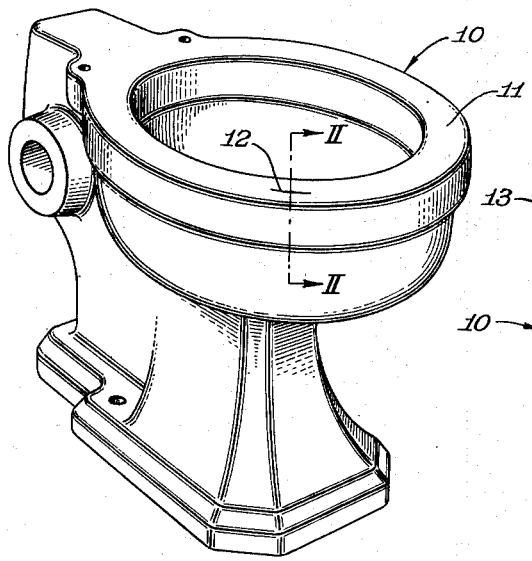
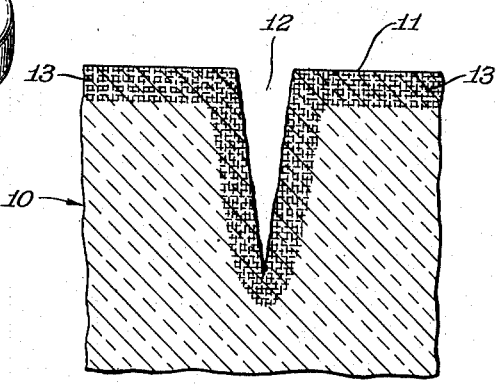
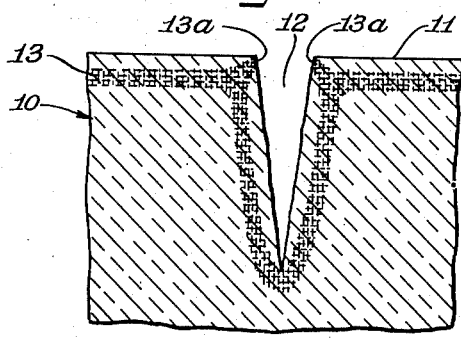
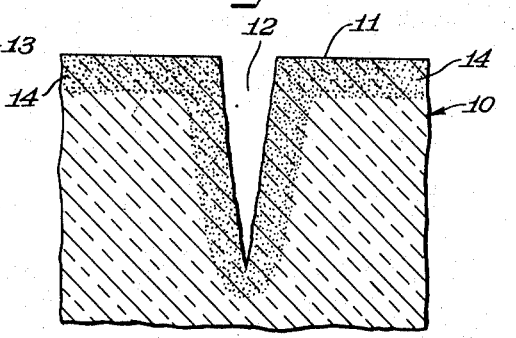
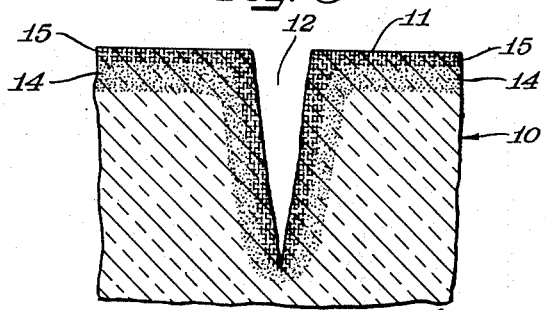
Inventors
Taber de Forest &
Henry N. Staats
by The Firm of Charles W. Hills
Attys

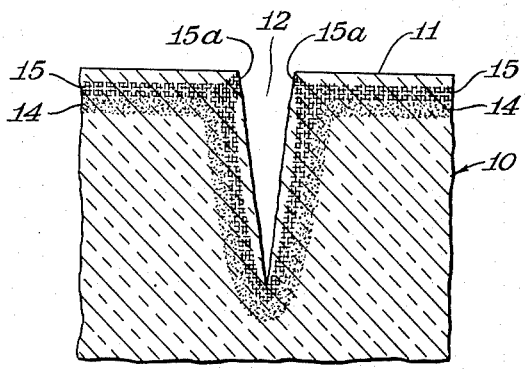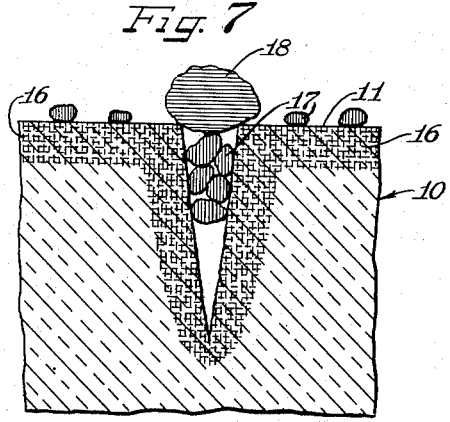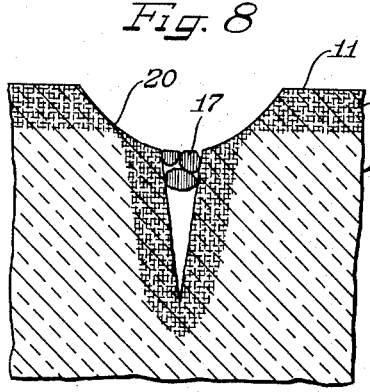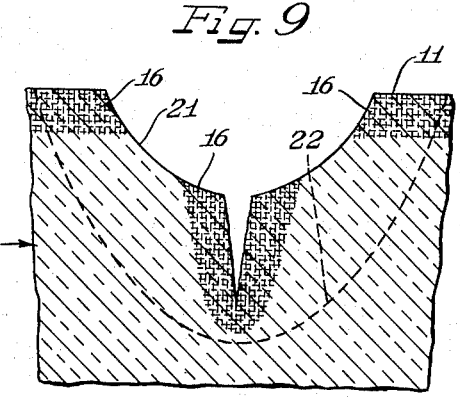

Patented Apr. 21, 1953

2,636,127

UNITED STATES PATENT OFFICE 2,636,127

METHOD OF DETECTING CRACKS IN POROUS SURFACES

Taber de Forest, Northbrook, and Henry N. Staats, Des Plaines, Ill., assignors to Magnaflux Corporation, Chicago, Ill., a corporation of Delaware Application March 14, 1949, Serial No. 81,316

9 Claims. (Cl. 250—71)

The present invention relates to a method of detecting cracks in porous surfaces, and more particularly to a method for the detection of such cracks by the use of colored or fluorescent material dispersed in a fluid capable of penetrating the porous surface.

The term "porous surface" as herein employed refers to a liquid permeable surface consisting of a myriad of pores, the surface being capable of serving as a filter to strain suspended discrete particles from suspension in a liquid medium.

In the manufacture of porous articles, and particularly in the manufacture of ceramic objects, it is often impossible visually to locate small cracks or other defects in the porous surface due to the light dispersive rather than reflective nature of the surface. A simple, easily employed method which gives an accurate and positive location of cracks in the surface is greatly desired as an inspection aid in the manufacture of various products such as the manufacture of clayware articles. In the manufacture of such articles, as for instance clayware toilet closets or bowls, component parts of the larger unit are cast, assembled, smoothed off with water or "finished," and then dried to a substantially "bone dry" condition by air drying for period ranging from one to five days, and/or dried in drying ovens at moderate temperatures for several hours. A glaze producing coating is then applied to the bone dry article which is subsequently heated at elevated temperatures in firing kilns to fire the glaze.

It has been found that during the drying operation prior to firing, unequal drying strains may develop which produce drying cracks, or "green checks," in the porous surface. These green checks, as produced during the drying, are minute but open up considerably during the subsequent firing to render the fired article unsuitable for use or sale. If it were possible to locate the defects prior to firing, the cracks could be eliminated and filled with additional clay material so that, upon firing, the finished articles would be free of cracks or other surface defects.

Various inspection methods have heretofore been proposed for the location of cracks in porous surfaces. For example, it has been proposed that unfired ceramic or clayware articles be inspected by the application of a fluid such as water, kerosene or glycerine to the porous surface and observing the coloration which appears at the flaw as a fleeting light or dark spot on the surface. The methods of the prior art give at best only a momentary indication of the location of flaws in the surface and give no hint as to the size or extent of the defect.

The present invention now provides a method whereby cracks or surface defects in porous surfaces may be readily located and the size and extent of the defect ascertained. The defects are positively located on the surface. The surface indication persists indefinitely until removed, while the sub-surface indication may persist for a period of from five to sixty minutes, depending upon the type of material being inspected. Thus, the operator may eliminate defects while having an indication of the location, size and extent thereof.

While our invention is particularly applicable to the inspection of ceramic surfaces, it may be applied to any fired or unfired porous material having a myriad of interconnected pores. Concrete, cement, wood, insulators, resistor tubes, graphite seals and powdered metal compacts, such as unsintered tungsten carbide compacts, are exemplary of unfired non-ceramic materials which may be inspected by the use of the method of the present invention. Fired porous material, such as spongy compacts of sintered metals for bearings may also be inspected for the determination of surface defects.

The term "porous" as used herein applies to any body having a surface, or a surface and interior, that is, or are, permeable in a more or less general and uniform manner to low viscosity liquids, such as the liquid penetrants herein referred to.

The present invention comprises the application of a dispersion of a colored material such as a pigment, or a mixture of a dye and pigment, in a penetrating fluid to the porous surface to be inspected. The dye or pigment may be of two general types; either colored for observation under white light such as daylight, or luminescent for observation in the presence of exciting illumination. Preferably, but not necessarily, the coloring material selected should be of such character that it will be dissipated upon heating the articles tested, so as to avoid staining or discoloring the finished articles.

The penetrant or penetrating fluid may be any liquid capable of penetrating the porous surface without harmful effect. We have found various water-soluble or insoluble polar or nonpolar penetrating fluids may be employed. For example, we have found acetone, methyl ethyl ketone, ethanol, isopropanol and glycerol to be suitable water miscible fluids, while ethyl acetate, butyl acetate, carbon tetrachloride, toluene, xylene, motor lubricating oils (heated to decrease the viscosity), and light petroleum distillates, such as kerosene and petroleum ether, are examples of suitable water un-miscible fluids.

We have found that when a liquid penetrant is placed upon a porous body containing a crack, as by spraying or flooding the surface with the penetrant, the fluid penetrates the surface and is absorbed more rapidly at the crack than at other points upon the surface. This phenomenon is believed to be caused by the fact that the crack, having depth and length, presents an additional porous, under-the-surface area. As the absorption of liquid by porous bodies is roughly proportional to the surface area presented to the liquid, the additional absorption areas presented by the crack will cause more liquid to be absorbed at the defect. Due to the greater absorption of the liquid by the crack, there will be a tendency for the liquid and the pigment dispersed therein to migrate over the surface of the body to the site of the crack. The present invention applies this principle to the inspection of porous surfaces and determines the presence of surface defects by the application of the pigment dispersion to the surface and observing the concentration of pigment to determine the location of the defects.

Thus, a method of inspection of the present invention may be described, in general, as consisting of contacting a porous surface with a pigment dispersed in a penetrating liquid, allowing the liquid to penetrate the porous surface with the preferential absorption of the liquid by any defects in the surface and observing the pigment concentration by means of the contrasting visible color of non-luminescent pigments or by the luminescence of luminescent pigments when subjected to exciting radiation.

We have found that we may employ dyes dispersed in the penetrating liquid as a true solution, as a semi-colloidal dispersion or as a suspension of discrete particles. The term "semi-colloidal dispersion" as used herein refers to a substantially non-settling dispersion of discrete particles in a liquid medium, the particles ranging in size from those capable of passing a 325 mesh sieve to those of true colloidal size, the dispersed particles being of such size as to be filtered from the liquid medium upon the porous surface. In the use of soluble colors or luminescent dyes, the dye in solution in the penetrating solvent will penetrate the surface and any defect which may be present in the surface. In the use of suspensions of discrete pigment particles in a penetrating liquid, the particles will be filtered from their suspension in the penetrant to remain upon the porous surface. In general, we prefer to employ suspended particles which are of greater size than any surface cracks or other defects in the article being inspected. Semi-colloidal particles present in the penetrating liquid as a semi-colloidal dispersion may also be filtered from the penetrant to remain upon the porous surface, although the particles are preferably small enough to enter any cracks in the surface and to become lodged in the cracks beneath the surface.

In employing solutions of dyes in penetrating fluids together with semi-colloidal dyes and/or pigments, we prefer to apply the dye solution to the porous surface by coating, dipping, spraying, flooding or otherwise contacting the surface with the solution. The dye solution is allowed to penetrate the surface to cause some coloration of the surface itself during the penetration. Such overall coloration or fluorescence of the surface would, if not minimized, interfere with the location of defects although some preferential absorption of the fluid at surface defects will occur. The overall coloration of the surface may be substantially removed or minimized by washing or flooding the surface with penetrant to redissolve the dye and cause it to penetrate further into the body leaving the surface relatively free of coloration. However, the coloration will not be removed from the cracks due to the depth of penetration of the dye, a factor which will render the re-dissolving of all the dye by the penetrant negligible. Thus, the dye present in the defect will cause the defect to be preferentially colored so that defects may be easily located by the presence of the dye.

We may also locate defects in the porous surface by the use of a colorless penetrating fluid containing either colored or luminescent pigment particles with or without semi-colloidal coloring matter in suspension. The suspension of pigment and liquid is applied to the surface by any suitable method and preferential wetting of the defect occurs immediately due to the additional porous under-the-surface area of the crack. The preferential wetting of the defect will cause the suspension to be drawn to the site of the defect so that the absorption of the penetrating liquid by the porous surface will filter out the pigment particles upon the surface in a position adjacent or overlying the crack. Such a concentration of pigment particles at the location of the defect may be determined by visual inspection either under white light or under exciting illumination.

It is also possible to locate surface defects in porous surfaces by the use of colored or luminescent particles of varying particle size. For example, it is possible to employ a penetrating liquid containing a dissolved soluble dye, a second dye present as a semi-colloidal dispersion in the solution, and a pigment dispersed in the solution as discrete particles. The mixture of dyes, or of dyes and pigments, in the penetrating fluid is applied to the surface to be inspected, the soluble dye penetrating the surface with the fluid while the semi-colloidal and pigment particles are filtered out upon the surface, the smaller particles becoming lodged in any cracks present in the surface. The location of any cracks in the surface is first determined by the concentration of pigment particles upon the surface, and the crack thus indicated is partially gouged out until all of the pigment particles are removed. With the removal of the pigment particles, the semi-colloidal particles lodged within the finer portions of the crack will become visible. Gouging is then continued until the coloration of these particles disappears. Following the removal of the semi-colloidal particles lodged in the crack, the soluble dye serves to indicate the extent of the crack. The crack is then further gouged until the coloration of the dye is removed, so that the operator may be sure, if that is desired, that the crack is entirely eliminated. Following this operation, clay in plastic condition may be applied to the gouged crack to fill the same so that upon subsequent firing no surface defects will be present.

We have found that a more sensitive location of surface defects and a substantial saving in penetrant and dye may be effected by pre-wetting the porous surface with a fluid. In bone dry clayware surfaces, for example, the porous surface is so receptive to the penetrating fluid that relatively large amounts of fluid may penetrate the surface so rapidly that the preferential wetting of the defect will be minimized. By lightly sponging water onto the dry surface and allowing the surface to absorb the water for a period of a few seconds, the pores of the surface become more or less saturated and plugged, while any cracks or surface defects remain open. The porous surface will then absorb less of the penetrating fluid, and the fluid and the dye dispersed therein will have more opportunity to migrate to any cracks so that preferential wetting of the cracks may take place. For use with such a pre-wetting step where water is used as the moistening agent, we prefer to employ a water insoluble or oily penetrant to avoid dilution of the penetrating fluid and to prevent commingling of the indicating fluid and the moistening agent with a consequent reduction in the sensitivity of the defect indication. It will be readily understood that we may employ a water insoluble penetrating fluid as the pre-wetting agent in conjunction with a subsequently applied water soluble penetrating agent carrying the dispersed dye material.

It is, therefore, an important object of the present invention to provide a method for the determination of the location and extent of cracks in porous surfaces by applying to the porous surface a dispersion of a pigment in a penetrating liquid, said pigment having a color contrasting with that of the surface, allowing the liquid to penetrate the porous surface and determining the location of cracks in the surface by observing the pigment concentration upon the surface at the defect.

It is another important object of the present invention to provide a method for locating cracks in porous surfaces by the application thereto of a dispersion of a fluorescent dye in a penetrating liquid, allowing the liquid to penetrate the porous surface, applying a solvent to the surface to dilute the dye concentration except at the opening of any crack that may be present, and subjecting the surface to exciting radiation, whereby any concentration of the luminescent dye at cracks present in the surface may be located.

It is a further object of the present invention to provide a method of detecting cracks in porous surfaces by pre-wetting the surface with water, applying to the surface a soluble dye dissolved in a penetrating liquid, allowing the liquid to penetrate the porous surface, applying penetrating liquid alone to the surface to reduce the intensity of surface coloration and observing the presence or absence of color concentrations indicating the presence or absence of cracks in the surface.

It is a still further important object of our invention to provide a method of detecting cracks in porous surfaces or articles which is extremely simple, efficient and economical, and which lends itself to use in mass production.

Still another object of this invention is to provide a method of determining cracks in porous surfaces or articles wherein the detecting material may be dissipated in the normal course of production of the article, thereby avoiding staining thereof.

It is a yet further important object of the present invention to provide a method for the determination of the location of cracks in porous surfaces by applying to the surface a penetrating liquid containing a dye in solution, a second dye as a colloidal dispersion, and a dispersion of discrete pigment particles, allowing the liquid to penetrate the porous surface, observing any concentration of pigment particles upon the surface to indicate the location of cracks therein, removing the pigment particles, observing colloidal particles lodged deeper in the cracks, removing the colloidal particles and determining the depth to which the soluble dye has penetrated to ascertain the extent of such cracks below the surface.

Other and further objects and features of the present invention will become apparent from the following description and appended claims.

An example of the present invention will now be described with special reference to the drawing, in which:

Figure 1 is a perspective view of a dry, unfired toilet bowl having a crack formed in the surface thereof;

Figure 2 is a magnified, sectional view taken along the line II—II of Figure 1 with a cross-hatched layer showing the absorption by the porous surface of a solution of a soluble dye in a penetrating fluid;

Figure 3 is a sectional view similar to Figure 2 showing the removal of surface coloration and the indication of the location of the crack following the application of penetrating fluid alone;

Figure 4 is a sectional view similar to Figure 3 illustrating a modification of the present invention in which the surface of the object is first wetted with water;

Figure 5 is a sectional view similar to Figure 4 showing the application of a dye solution to the water-wetted surface of Figure 4;

Figure 6 is a sectional view similar to Figure 5 showing the layers in and about the location of the crack following the application of straight penetrating fluid over the dye solution;

Figure 7 is a sectional view illustrating a third modification of the present invention in which a dispersion of a soluble dye, colloidal particles and suspended particles in a penetrating fluid is applied to the surface of the porous object, with the soluble dye penetrating the surface, the colloidal particles lodged in the crack, and the suspended pigment particles filtered out upon the porous surface;

Figure 8 is a sectional view similar to Figure 7 showing the initial gouging of the crack to a depth sufficient to remove the pigment particles and a portion of the colloidal particles; and Figure 9 is a sectional view similar to Figure 8 illustrating in full lines the further gouging of the crack to a depth sufficient to remove the colloidal particles, and in dotted lines the final gouging to a depth sufficient to eliminate the soluble dye and thus eliminate the crack altogether.

As shown on the drawings:

The method of the present invention, as has been hereinbefore described, may be employed for the location of surface cracks in porous bodies. The method is particularly applicable to the location of defects in either fired or unfired porous ceramic or other materials. In Figure 1 reference numeral 10 refers generally to a portion of an unfired ceramic article such as a toilet bowl in substantially dry ("bone-dry") condition. The bowl 10 has a crack 11 formed in its porous surface 12, the crack being invisible to the unaided eye due to the diffractive porous surface of the bowl.

As shown in Figures 2 and 3, the location of the crack 11 in the surface 12 may be determined by the method hereinbefore described by the application of a solution containing a dye dissolved in a penetrating liquid such as a light petroleum distillate. As shown in Figure 2, the penetrating liquid and dye solution 13 penetrates the surface of the porous material and into the crack to color the edges thereof. The dye dissolved in the penetrant may be of any desired color when viewed under either visible light or exciting illumination such as ultra-violet light. As illustrated in each of the Figures 2-9, inclusive, the dye is yellow as, for example, would be obtained by the use of a solution of 2.7 dimethyl coeroxen dissolved in a petroleum distillate when viewed under ultra-violet light. The color may be largely removed from the surface 12, as shown in Figure 3, by applying penetrating liquid alone. The dye present on the surface 12 is dissolved by the additional penetrant and will be absorbed by the porous body 10. The coloration is thus effectively removed from the surface 12. Due to the depth penetration of the dye solution 13 into the crack 11, the re-dissolving of the dye present in the crack will be negligible, and following removal of coloration from the surface 12, the color of the dye within the crack may be observed. Further, we have found that a definite color break may be observed at the edge of the crack as illustrated at 13a in Figure 3. This color break is believed due to some surface tension effect which is produced following the application of the penetrant and remains visible for a period of from five to sixty minutes. It should be understood that the dye employed may be either fluorescent or non-fluorescent and may be observed by the use of ordinary sunlight or artificial light, or by the use of an exciting radiation, depending upon the type of dye employed.

Figures 4-6 illustrate a modification of the method of the present invention in which water is lightly sponged onto the dry surface and allowed to be absorbed for a period of a few seconds. As shown in Figure 4, the water will be absorbed by the surface as indicated at 14 and by the side surfaces of the crack in a manner analogous to the absorption of the soluble dye as shown in Figures 2 and 3. Following the application of the water and the absorption of the water by the surface, a soluble dye solution similar to that hereinbefore described is applied to the pre-wetted surface, as shown in Figure 5. The water will have tended to temporarily saturate or plug the surface pores, but any cracks, being much larger than the pores, are not plugged by the water. The dye solution will penetrate superficially into the porous object as indicated at 15, although not so rapidly nor so deeply as when applied to a dry surface, thus giving the dye solution more opportunity to be attracted by the large absorptive surface presented by the crack. Following the application of the soluble dye, the penetrating liquid alone is applied, as shown in Figure 6, in a manner analogous to that of Figure 3 hereinbefore described. The coloration exhibited by the crack will be more pronounced than that obtained by the method illustrated in Figures 2 and 3 due to the greater migration of the dye solution to the crack and the lesser penetration of the pre-wetted surface by the dye solution. The same color break may be observed at the upper edge of the crack 2. Either fluorescent or non-fluorescent dye solution may be employed in connection with the pre-moistening of the porous surface.

A third modification of the method of the present invention is illustrated in Figures 7-9 inclusive. This method contemplates the employment of a penetrating liquid containing a dissolved soluble dye, a semi-colloidal dispersion of a second dye and suspended particles of a suitable pigment. Under some circumstances it may be preferred that the differently sized colored materials dispersed in the penetrant possess different identifiable colors so that the presence of each material may be determined. As illustrated, the pigment particles may be blue when viewed under ultra-violet light, while the semi-colloidal particles and the dissolved dye may be red and yellow, respectively, when similarly viewed.

As illustrated in Figure 7, the dye solution penetrates the porous surface of the porous article as at 16 in a manner similar to that hereinbefore described. The suspension of semi-colloidal particles 17 preferentially wets the crack 11 in the manner hereinbefore described, due to the under-the-surface area presented by the defect. Those particles 17 carried by the penetrant absorbed by the crack 11, if of a size less than the width of the crack, will enter the crack and will be lodged therein in a position intermediate the depth of the crack. Those particles 17 not entering the crack, being larger than the pores of the surface, will be filtered out on the surface 12. The suspended pigment particles 18, being larger than the opening of crack 11, are filtered out upon the surface 12 of the porous body during the absorption of the dye solution by the surface. Due to the greater absorbing surface presented by the crack, a greater volume of the penetrant containing the dye and pigment particles dispersed therein will be attracted to the crack and a greater concentration of the dispersed particles will be deposited directly over the crack or closely adjacent thereto. Thus, to determine the position of the crack, the concentration of pigment particles filtered out on the surface adjacent and overlying the crack is observed.

Following the location of the crack, if the crack is of such magnitude or so situated that it can be advantageously eliminated, it may be gouged out, as shown in Figures 8 and 9. In the initial gouging operation, the particles 18 are removed. Following the removal of the pigment particles 18 from the surface by gouging to a depth such as indicated at 20, the crack is still made visible by the presence of the semi-colloidal particles 17 within the crack. As the crack is further gouged out to the depth shown at 21 in Figure 9, the particles 18 are removed and the extent of the crack may be followed by the dye coloration surrounding the crack. The gouging operation may be continued to the dotted line 22 until all of the dye coloration is removed, thus insuring complete elimination of the crack. The gouged out portion may then be filled with clay in a plastic condition and later fired to prepare a fired article having no surface defects or cracks formed therein.

Preceding the steps described in connection with Figures 7, 8 and 9, the operator may apply to the surface of the article an amount of water sufficient to limit the extent of penetration of the soluble dye, as described in connection with Figures 4 to 6. The combination with the water barrier step of the other steps described in connection with Figures 7, 8 and 9 provides a practical way of insuring the detection not only of the presence of cracks but also of their extent.

As has been hereinbefore explained, the dyes and pigment particles of the present invention may be of either the fluorescent or non-fluorescent type. The present invention contemplates the application of either a fluorescent or non-fluorescent dye to the surface of the porous article and after the application of straight solvent to dissipate the dye from the surface except at the cracks, if present, the detection of such cracks by the concentration there of the dye. By the use of fluorescent pigments it is possible to employ a much lower concentration of pigment inasmuch as an extremely small amount of fluorescent particles may be easily observed under ultraviolet light. We have found that it is possible to employ fluorescent particles in an amount equal to about 10% of that amount of colored dyes necessary to obtain a visual coloration. The advantage of using fluorescent pigments and dyes is immediately obvious since much lower concentrations of dye or pigment can be effectively employed. Furthermore, because of the smaller quantities required, there is no problem of contamination of the surface and consequent non-adherence of the glaze coating when fluorescent materials are employed.

As to the particular dyes or pigment particles which may be employed, we have found that the following formulations are particularly suitable for use with the present invention.

For use with the first method, viz., that described in connection with Figures 2 and 3 of the drawings, any dye which is soluble in the desired penetrating oil may be employed. As examples of suitable fluorescent solutions, we may employ the following formulations:

(1) 0.2% 2,7-dimethyl coeroxen dissolved in 99.8% light petroleum distillate, or (2) 0.2% Perylene dissolved in 99.8% light petroleum distillate, or (3) 0.2% Celliton Brilliant dissolved in 99.8% kerosene.

The following non-fluorescent materials may be employed:

(4) 1.5–2% Oil Red EG dissolved in 98.5–98% light petroleum distillate, or (5) 1.5–2% Oil Soluble Green dissolved in 98.5–98% light petroleum distillate.

The rinsing solvent for the removal of surface coloration is preferably the same penetrating fluid without the dye.

As an example of a suitable formulation for use in the method as described in connection with Figures 7–9, inclusive, we prefer to employ the following mixture:

(6) 12.00% Turkey red oil (sulfonated castor oil)
00.18% chrysene
00.06% Rhodamine B extra
00.18% 2,7-dimethyl coeroxen
87.58% light petroleum distillate Since the absence of any staining or discoloration of the finished article is important, the dyes and/or pigments selected should be such as will be volatilized or otherwise dissipated upon subsequent firing of the article. The dyes and pigments in the above formulae are of that character.

Other fluorescent pigments such as zinc sulphide may be employed in place of the chrysene, while nonfluorescent pigments such as Oil Red EG, green toner, red permanssa or other non-fluorescent pigments may be employed. Other fluorescent dyes such as perylene, or non-fluorescent oil-soluble dyes such as Oil Red EG or an oil-soluble green may be substituted in formulation in place of the 2,7-dimethyl ceroxen. Di- (octadecyl carbonic) ester of lenco dimethoxy dibenzanthrone, dinaphthalene oxide or other dyes capable of forming semi-colloidal dispersions in penetrating fluids may be employed in place of Rhodamine B. In the preferred formulation above given, the limits of the pigment may vary from 0.1 to 0.2% and the soluble dye concentration may be similarly varied. The Rhodamine B content may be increased by increasing the sulfonated castor oil content.

In place of Turkey red oil, other substances having a mutual solvent effect upon the dyes and penetrant may be used, such as sulfonated petroleum oils, sulfobenzene stearic acid, oleic acid and the like.

It is to be noted that in the above formulation two differently colored dyes and a pigment are employed. The 2,7-dimethyl ceroxen and chrysene are yellow and bright blue, respectively, under ultra violet light, while the Rhodamine B is red. Thus, during the chasing of the crack the operator first removes material from the surface until the blue coloration of the chrysene pigment disappears, at which time the red color of the Rhodamine B will become visible. Following the removal of the red Rhodamine B, the yellow color, due to the presence of 2,7-dimethyl coeroxen, will then be noted, and upon the disappearance of this color the operator is assured that the crack has been completely chased.

In the use of non-fluorescent particles and dyes, it is evident that differently colored dyes should be employed so that the same effect may be obtained during the chasing of the crack.

It should be understood that semi-colloidal dispersions or suspensions of discrete particles of either luminescent or non-luminescent dyes may be employed alone or in combination with each other or with soluble dyes to determine the location and extent of cracks in porous surfaces.

As has been hereinbefore described, it is preferable in many operations to pre-wet the porous surface with a small amount of water prior to the application of the dye dispersion. It is believed that the water functions to partially plug the surface pores. Thus, a smaller amount of fluid is absorbed by the surface, and the surface will stay flooded longer to allow the particles more time to be attracted to the site of the defect. Clayware, which is bone-dry, will readily absorb the penetrating fluid. We have found that if the bone-dry surface is pre-wetted with water, a substantial saving in the amount of treating fluid employed may be effected with an increase in the amount of coloration obtained at the defect. For example, it has been found that when bone-dry ware is pre-wetted with water for periods of time not exceeding twelve seconds the amount of inspection fluid required may be cut from about 3 to 4% by weight to less than 1% of the weight of the porous article. Further, absorption of less treating fluid decreases the possibility of contamination of the kiln atmosphere upon the evaporation of the penetrant during the firing of the treated material. Also, it may be desirable to remove all of the penetrant before firing to completely eliminate the possibility of contaminating the kiln atmosphere. We have found that water used in the pre-wetting step is an aid in driving off the distillate. For example, a bone dry piece of ware which is inspected for defects will require approximately 50 minutes to remove all traces of the penetrating fluid. The same piece of ware which has been pre-wetted and made to absorb the same amount of penetrant during inspection could be made free of penetrant after drying for a period of from 20 to 25 minutes. If the surface is pre-wet with water, we prefer to use a water immiscible penetrating fluid such as a light petroleum distillate, toluene, and the like. It is also possible to pre-wet the porous surface with a water immiscible liquid, in which case a water miscible penetrating fluid such as acetone, ethanol, or the like, is employed. In either case, the pre-wetting agent and penetrant are immiscible.

As an example of a non-aqueous but water-miscible penetrant composition, the following may be given:

0.20% chrysene
0.25% Rhodamine B extra
99.55% acetone

In addition, aqueous penetrant compositions such as the following may be used:

0.60% CaCO₃
0.01% alkynaphthalene-sodium sulfonate
0.60% fluorescein-sodium (uranine yellow)

Other wetting agents than alkynaphthalene sodium sulfonate may be used.

As to the chemical structural formulae of some of the dyes and pigments referred to herein, the following are believed to be correct:

Chrysene: oil-soluble, bright blue under ultra-violet.

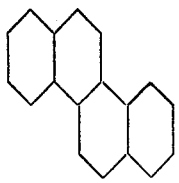

Celitone Brilliant: oil-soluble, yellowish under ultra-violet:

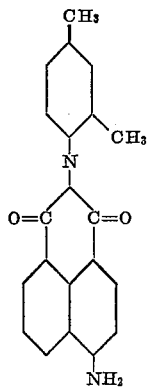

Oil-soluble dyes:

1.

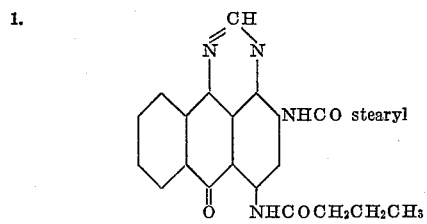

2.

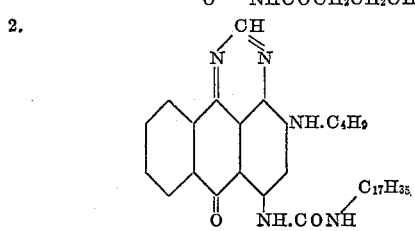

Lumogen fluorescent pigments:

3.

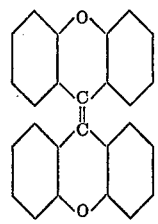

4.

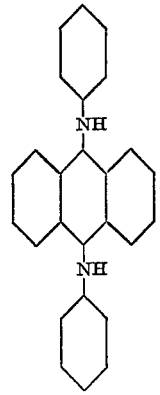

In place of 2,7-dimethyl coeroxen, N-butyl-4-butylamino naphthalimide may be used in the same concentrations and combinations, as a yellow fluorescent, oil-soluble dye. Perylene is slightly oil-soluble and is yellow under ultra-violet.

Unless otherwise stated herein, percentages given are percentages by weight.

It will, of course, be understood that various details of the process may be varied through a wide range without departing from the principles of this invention, and it is, therefore, not the purpose to limit the patent granted hereon otherwise than necessitated by the scope of the appended claims.

We claim as our invention:

1. The method of detecting cracks in porous bodies and bodies having porous surfaces, which comprises applying to the surface an oil soluble dye dissolved in a penetrating oil, allowing the solution to penetrate the porous surface, applying penetrating oil alone to the surface, and draining said last mentioned penetrating oil through said surface to remove surface coloration through the porous surface, and observing the presence or absence of a concentration of color indicating the presence or absence of cracks in the surface.

2. The method of detecting cracks in porous bodies, which comprises applying to the surface an amount of water capable of being absorbed by the surface, subsequently applying to the moistened surface a solution in a penetrating oil of an oil-soluble dye contrasting in color with the normal surface color, causing a portion of the solution to penetrate the moistened porous surface, removing surface coloration by the application of penetrating oil alone and draining said last mentioned penetrating oil through said surface, and observing the presence or absence of a concentration of color indicating the presence or absence of cracks in the surface.

3. The method of detecting cracks in porous surfaces, which comprises applying to the surface an amount of water capable of being absorbed by the surface, subsequently applying to the moistened surface a luminescent oil-soluble dye in a penetrating oil, allowing a portion of the solution to penetrate the moistened surface, removing surface coloration by the application of penetrating oil alone to and the drainage thereof through said surface, and subjecting the surface to exciting radiation, whereby the location of the luminescent dye and cracks in the surface may be determined.

4. The method of detecting cracks in a porous body and a body having a porous surface, which comprises applying to the surface of such body a liquid oily penetrant having dissolved therein a penetrant-soluble coloring material having visual characteristics differing from those of said surface, draining the penetrant through the surface, applying penetrant alone to the surface, and draining said last mentioned penetrant through said surface to remove through the surface any residual coloring material causing surface coloration, and observing the presence or absence of a concentration of color indicating the presence or absence of cracks in the surface.

5. The method of detecting cracks in a porous surface, which comprises applying freely to such surface a non-aqueous liquid penetrant having dissolved therein an oil-soluble dye having visual characteristics differing from those of said surface, allowing the penetrant to penetrate the porous surface and any cracks therein, subsequently applying to the surface an additional liquid free from dissolved dye but in which said dye is soluble, and draining said last mentioned additional liquid through said surface to remove by surface penetration any residual dye causing surface coloration, and thereafter observing the presence or absence of any concentration of dye coloration at the surface to thereby determine the location of any cracks therein.

6. The method of detecting cracks or surface flaws in a porous body, which comprises applying to the surface of the body a liquid non-aqueous penetrant having dissolved therein an oil-soluble dye having visual characteristics different from those of said surface, draining said penetrant from the surface into the interior of the porous body to leave only a residual coloration at the surface thereof, applying to the surface a liquid capable of dissolving any residual dye causing the surface coloration and draining said last mentioned liquid through said surface into said body, and observing the concentration of dye coloration on the surface to determine the location of cracks therein.

7. The method of detecting cracks in porous bodies and bodies having a porous surface, which comprises applying to such surface for absorption thereby a body of liquid, draining said liquid through said surface, applying to said surface after the draining of the liquid therethrough a liquid non-aqueous penetrant having dispersed therein a soluble dye having visual characteristics different from those of said surface, draining said later applied penetrant through said surface to leave thereon residual surface coloration, removing the surface coloration by the application of penetrant alone to and the drainage thereof through said surface, and observing the presence or absence of dye concentration on the surface indicating the presence or absence of cracks therein.

8. The method of detecting cracks in a porous surface, which comprises applying to said surface a liquid penetrant having dissolved therein a soluble dye with visual characteristics differing from those of said surface, draining said penetrant into the porous surface and any cracks therein, subsequently applying to the surface an additional liquid that is a solvent for said dye but that is free from any dissolved dye, and draining said last mentioned additional liquid through said surface to displace from said surface any residual dye causing surface coloration except at a crack where a color break indicates the presence of the crack.

9. The method of detecting cracks in porous surfaces, which comprises applying to the surface an amount of a first liquid capable of being absorbed by the surface, draining said first liquid into said surface to establish a subsurface barrier against immiscible liquids, applying to said surface a liquid penetrant immiscible with said first liquid and having dissolved therein a soluble dye having visual characteristics differing from those of said surface, draining a portion of said liquid penetrant into said surface, applying liquid penetrant alone to said surface, and draining said last mentioned liquid penetrant through said surface to displace residue coloration from said surface except at cracks in the surface, and observing the presence of concentration of color at the cracks.

TABER DE FOREST.
HENRY N. STAATS.

References Cited in the file of this patent

UNITED STATES PATENTS

| Number | Name | Date |
|---|---|---|
| 2,180,508 | DeFraine | Nov. 21, 1939 |
| 2,340,940 | DeForest | Feb. 8, 1944 |
| 2,405,078 | Ward | July 30, 1946 |
| 2,420,646 | Bloom, Jr. et al. | May 20, 1947 |

FOREIGN PATENTS

| Number | Country | Date |
|---|---|---|
| 224,242 | Switzerland | Feb. 1, 1943 |

OTHER REFERENCES

Fluorescent Penetrant, by G. Ellis, Steel, Oct. 16, 1944, pp. 100–102, 164.